Figure 1:
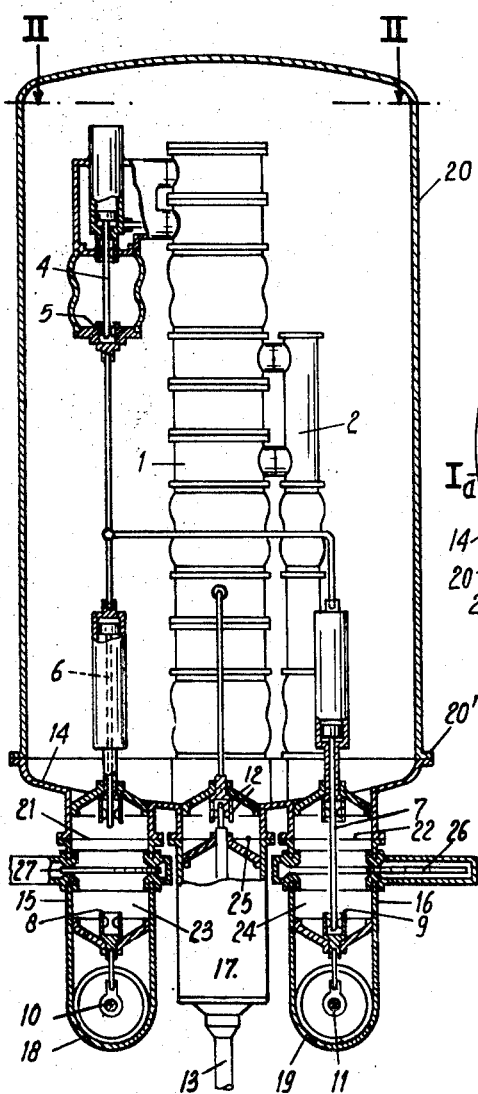

United States Patent

[11] 3,578,924

| [72] | Inventor | Rintje Boersma<br>Harmelen, Netherlands |
|---|---|---|
| [21] | Appl. No. | 815,345 |
| [22] | Filed | Apr. 11, 1969 |
| [45] | Patented | May 18, 1971 |
| [73] | Assignee | N. V. "COQ" Utrecht<br>Netherlands |
| [32] | Priority | Apr. 23, 1968 |
| [33] | | Netherlands |
| [31] | | 6,805,720 |

[54] METAL CLAD SWITCH GEAR FOR HIGH VOLTAGES
10 Claims, 2 Drawing Figs.

[52] U.S. Cl. .................................................. 200/48,
317/103
[51] Int. Cl. ............................................. H01h 31/00
[50] Field of Search ............................................. 317/103;
200/48

[56] References Cited
UNITED STATES PATENTS
3,331,930  7/1967  Clason ........................ 200/48
FOREIGN PATENTS
1,553,787  1/1969  France ........................ 317/103

*Primary Examiner*—Robert K. Schaefer
*Assistant Examiner*—H. J. Hohauser
*Attorney*—Snyder & Butrum ABSTRACT: Metal clad switch gear for high voltages, all switches and accessories belonging to the same phase of a switching unit of the switch gear being accommodated in a common metal vessel which consists of a base member supporting said switches and accessories and a hood which is detachably secured with its lower rim to said base member and encloses said switches and accessories while remaining clear thereof.

Patented May 18, 1971

3,578,924

INVENTOR

RINTJE BOERSMA

BY

ATTORNEYS

METAL CLAD SWITCH GEAR FOR HIGH VOLTAGES

The invention relates to metal clad switch gear for high voltages comprising at least one bus bar system and switching units connected thereto, all switches, connecting conductors and auxiliary devices belonging to said switches of each individual phase of each one of said switching units being accommodated in a common metal vessel forming part of the metal envelope adapted to be connected to earth and enclosing the switch gear.

Switch gear of this kind is known from the French specification 1,375,899 and the Swiss specification 354,141. In this switch gear inspection and repair of the switches and other parts and devices is not possible without the complete dismantling of portions of the envelope and the electrically conductive parts of the relevant switching unit contained therein.

The invention has the object to provide switch gear of this kind, in which all elements of the switching units can be readily made well accessible without the necessity of taking the conductive parts thereof to pieces, so that inspection of the switches, the connections, the elements of the signal and protection systems and the insulation is facilitated very much and supervision becomes possible, while all elements of the circuit are interconnected as in operation. This is accomplished in that the vessel consists of a base member and a hood which is detachably secured with its lower rim to said base member, said base member being mounted on the envelope of the bus bar(s) of the bus bar system(s) and, if present, of terminal means for the connection of a cable or a network line and supporting all switches, connection conductors and auxiliary devices of the relevant phase of the switching unit in question, and said hood enclosing but remaining clear of all switches, switch parts and other devices belonging to the switching unit and mounted on said base member. If in a switching unit of such switch gear the hood is removed one has free access to all switches and accessory connections and devices, while they remain interconnected.

It is advantageous to provide the base member of the vessel at its lower side with at least two adjacent vertical tubular metal envelope members extending between said base member on one hand and the envelopes of two bus bars or the envelope of a bus bar and a cable or network line on the other hand, each one of said envelope members consisting of two detachably interconnected coaxial parts, one of said envelope members enclosing the switching chamber of a bus bar isolating switch and the other envelope member enclosing either the switching chamber of a second bus bar isolating switch or the terminal means for the connection of said cable or network line. In that case it is also possible to separate the base member with the switches, the switch parts and the accessory connections and devices mounted thereon from the bus bar systems connected to the other switching units and other parts of the switch gear and from the cable terminal box, if present.

An additional advantage of the switch gear constructed according to the invention is that the switches are so positioned in the vessel and are so interconnected as to form within the vessel a loop-shaped current path. This makes it unnecessary to make the vessel or large parts thereof from nonmagnetic material, which cuts down the cost of the switch gear considerably.

Figure 2:
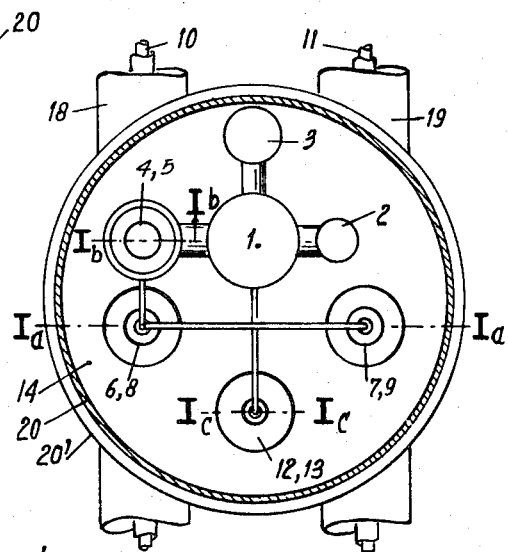

The invention will be elucidated with the aid of the accompanying drawing; therein shows:

FIG. 1 vertical sectional views, taken on lines Ia–Ia, Ib–Ib and Ic–Ic in FIG. 2, of a phase of a switching unit of switch gear according to the invention; and FIG. 2 a cross-sectional view taken on the line II–II in FIG. 1.

The drawing shows a switching unit comprising a composite circuit-breaker consisting of a gas blast circuit-breaker 1 to interrupt the circuit, said circuit-breaker 1 being connected to a conduit 2 for the supply of extinguishing gas, e.g. $SF_6$-gas, under high pressure and a conduit 3 for the discharge of used extinguishing gas under lower pressure, as well as of an isolating switch having a pneumatically driven switching rod 4 and a fixed contact 5. This isolating switch 4,5 is opened just after the switching arc produced in the circuit-breaker 1 has been extinguished and it has the tasks to keep the circuit interrupted and to close the circuit. The isolating switch forming part of the composite circuit-breaker is permanently electrically connected with the pneumatically driven switching rods 6,7 of two bus bar isolating switches 6,8 and 7,9, of which the fixed contacts 8,9 are permanently connected with bus bars 10,11 of different bus bar systems. The gas blast circuit-breaker 1 is connected through a plug-and-bush connection 12 with the end of a cable 13.

All switches, the bus bar systems, the means for the connection of the cable and all not shown auxiliary devices, such as transformers, condensators and other devices for measuring instruments and protection apparatuses acting on the current or the tension, as well as earthing switches and control members are surrounded by a metal envelope which is to be connected with earth. This metal envelope consists of a bottom plate 14, vertical tubular members 15, 16, 17 connected to the lower side of said bottom plate, horizontal tubes 18,19 connected to the lower ends of said tubular members 15,16 and a hood 20 resting with its lower rim 20' on and detachably secured to the bottom plate 14. The horizontal tubes 18,19 contain the bus bars 10,11. The vertical tubular members 15,16 consist of two coaxial parts which are detachably interconnected at 21,22 and enclose the switching chambers 23,24 of the bus bar isolating switches 6,8 and 7,9. The tubular member 17 consists of two coaxial parts which are detachably secured to one another at 25 and contain the plug-and-bush connection 12 and not shown terminal members for the connection of the cable 13. The bottom plate 14 and the vertical tubular members 15, 16. 17 form together a base member resting on the bus bar tubes 18,19 and supporting all switches, connecting conductors and other devices belonging to the switching unit. The hood 20 surrounds the gas blast circuit-breaker, the isolating switch 4,5 the switching rods 6,7 of the bus bar isolating switches, when these rods are in their opened position, and the auxiliary devices belonging to the switching unit. If the hood 20 is removed, all these switches, switch parts and auxiliary devices are completely accessible for inspection, dismantling and repair.

It is also possible to separate at 21, 22, 25 the bottom plate 14 and the upper parts of the vertical tubular members 15, 16, 17 attached to the lower side of said plate from the lower parts of the tubular members 15, 16, 17 said lower parts being permanently connected to the bus bar tubes 18,19 and the cable 13. The switching unit can then be placed on the test bench, where the cooperation of the driving mechanisms of the switches and the signal and protection devices can be inspected in a manner simulating the conditions under normal operation. Since, mostly, it is not possible, when carrying out such an inspection, to make both bus bar systems dead, slidable partitions 26,27 are provided in the switching chambers 23,24 of the bus bar isolating switches 6,8 and 7,9, so that the lower parts of the switching chambers 23,24 containing the live fixed contacts 8,9 of the bus bar isolating switches can be closed, when the bottom plate 14 and all parts supported thereby and attached thereto is removed.

It is observed that in a switching unit for the interconnection of the two bus bars the terminal means for the connection of the cable may be omitted and the composite circuit-breaker consisting of the series connection of the gas blast circuit-breaker and the isolating switch for the permanent interruption will be connected between the two bus bar isolating switches.

I claim:

1. Metal clad switch gear for a high voltage electrical system which includes at least one bus bar and switching units electrically connected thereto and accommodated in a common metal vessel forming part of a metal envelope adapted to be connected to and enclosing the electrical system and including an envelope portion enclosing said bus bar, said vessel consisting of a base member and a hood which is detachably secured with its lower rim to said base member, said base member being mounted on said envelope portion enclosing said bus bar and supporting all switches, connecting conductors and auxiliary devices of the switching unit in question, and said hood enclosing but remaining clear of all switches, switch parts and other devices belonging to the switching unit and mounted on said base member.

2. Metal clad switch gear as claimed in claim 1, in which the base member of the vessel is provided at its lower side with at least two adjacent vertical tubular metal envelope members one of which extends between said base member and said envelope portion, each one of said envelope members consisting of two detachably interconnected coaxial parts, and a bus bar isolating switch enclosed in said one envelope member.

3. Metal clad switch gear as defined in claim 2, wherein said electrical system includes a second bus bar and said metal envelope includes a second envelope portion enclosing said second bus bar, the other of said envelope members extending between said base member and said second envelope portion, and a second bus bar isolating switch in said other envelope member.

4. Metal clad switch gear as defined in claim 3, wherein said electrical system includes a cable, a third envelope member adjacent the other envelope members and enclosing terminal means for said cable.

5. Metal clad switch gear as defined in claim 1, wherein said electrical system includes a cable, a vertical tubular metal envelope member depending from said base member, and terminal means for said cable enclosed within said envelope member.

6. Metal clad switch gear as defined in claim 2, wherein said electrical system includes a cable, and terminal means for said cable enclosed within the other of said envelope members.

7. Metal clad switch gear as defined in claim 6, wherein said one envelope member is provided with a movable partition for closing off such envelope member below the detachable connection between its coaxial parts.

8. Metal clad switch gear as defined in claim 2, wherein said one envelope member is provided with a movable partition for closing off such envelope member below the detachable connection between its coaxial parts.

9. Metal clad switch gear as defined in claim 3, wherein both said envelope members are provided with movable partitions below the detachable connection between their coaxial parts.

10. A metal clad switch gear for high voltage electrical systems comprising at least a pair of bus bars, metal tubes surrounding said bus bars, a switching unit connected thereto and including switches, connecting conductors and auxiliary devices for measuring, signalling and protecting purposes, said switches, connecting conductors and auxiliary devices being interconnected to define said switching unit, said unit being associated with one phase of the electrical system, a metal envelope connected to earth, said envelope enclosing said switching unit, said envelope comprising a metal base member and a metal hood detachably secured at its lower rim to said base member, said base member being mounted on at least the tube of one bus bar and supporting all switches, connecting conductors and auxiliary devices of said switching unit and said hood enclosing but remaining clear of all switches, connecting conductors and auxiliary devices of the unit supported by the base member to which the hood is secured.